United States Patent
Tsirkin

(10) Patent No.: US 12,079,133 B2
(45) Date of Patent: Sep. 3, 2024

(54) MEMORY CACHE-LINE BOUNCE REDUCTION FOR POINTER RING STRUCTURES

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 8 days.

(21) Appl. No.: 16/514,463

(22) Filed: Jul. 17, 2019

(65) Prior Publication Data

US 2021/0019261 A1 Jan. 21, 2021

(51) Int. Cl.
```
G06F 12/08       (2016.01)
G06F 9/455       (2018.01)
G06F 9/50        (2006.01)
G06F 9/54        (2006.01)
G06F 12/0891     (2016.01)
```
(52) U.S. Cl.
CPC ...... *G06F 12/0891* (2013.01); *G06F 9/45545* (2013.01); *G06F 9/45558* (2013.01); *G06F 9/5077* (2013.01); *G06F 9/544* (2013.01); G06F 2009/45583 (2013.01)

(58) Field of Classification Search
CPC ............. G06F 12/0891; G06F 9/45545; G06F 9/45558; G06F 9/5077; G06F 9/544
USPC ....................................................... 711/118
See application file for complete search history.

(56) References Cited

U.S. PATENT DOCUMENTS

| | | | | |
|---|---|---|---|---|
| 5,867,734 A * | 2/1999 | Drews | ...................... | G06F 9/52 710/52 |
| 6,124,868 A * | 9/2000 | Asaro | ................... | G06F 9/3879 345/565 |
| 6,353,874 B1 * | 3/2002 | Morein | ............... | G06F 12/0802 711/134 |
| 8,760,460 B1 * | 6/2014 | Kilgariff | ................... | G06T 1/60 345/557 |

(Continued)

OTHER PUBLICATIONS

Peter Pirkelbauer, Reed Milewicz; "Draft: Lock-free Ringbuffer Designs"; University of Alabama at Birmginham; accessed from https://pdfs.semanticscholar.org/8c15/b938e6fdbcbab6e1b5704857043e5c680734.pdf, on or before Apr. 2019; (12 Pages).

(Continued)

*Primary Examiner* — Gautam Sain
(74) *Attorney, Agent, or Firm* — Kilpatrick Townsend & Stockton LLP

(57) ABSTRACT

A system includes a memory including a ring buffer having a plurality of slots and at least one processor in communication with the memory. A subset of the plurality of slots are initialized with an initialization value. Additionally, the at least one processor includes a consumer processor and a producer processor. The producer processor is configured to receive a memory entry, identify an available slot in the ring buffer for the memory entry, and store the memory entry in the available slot at an offset in the ring buffer. The initialization value is interpreted as an unavailable slot by the producer processor. The consumer processor is configured to consume the memory entry and invalidate one of the subset of slots in the ring buffer by overwriting the initialization value with an invalid value to transition the one of the subset of slots from an unavailable slot to an available slot.

20 Claims, 10 Drawing Sheets

(56) References Cited

U.S. PATENT DOCUMENTS

| | | | |
|---|---|---|---|
| 2003/0026277 A1* | 2/2003 | Pate | H04L 47/34 370/428 |
| 2004/0064649 A1* | 4/2004 | Volpe | G06F 12/0862 711/137 |
| 2005/0198028 A1* | 9/2005 | Padmanaban | H04L 1/1832 |
| 2005/0235113 A1* | 10/2005 | Smirnov | H04N 21/44004 711/202 |
| 2006/0179211 A1* | 8/2006 | Aasheim | G06F 12/0246 711/103 |
| 2008/0120476 A1* | 5/2008 | Hastings | G06F 13/4239 711/148 |
| 2010/0332755 A1* | 12/2010 | Bu | G06F 9/52 711/119 |
| 2013/0132604 A1* | 5/2013 | Cohen | H04L 45/24 709/231 |
| 2013/0246672 A1* | 9/2013 | Saputra | G06F 9/524 710/56 |
| 2019/0065099 A1 | 2/2019 | Tsirkin | |

OTHER PUBLICATIONS

Luigi Rizzo, Paolo Valente, Giuseppe Lettieri, Vincenzo Maffionea; "PSPAT: Software packet scheduling at hardware speed"; Computer Communications, vol. 120, May 2018, pp. 32-45, Published by Elsevier B.V.; (14 Pages).

* cited by examiner

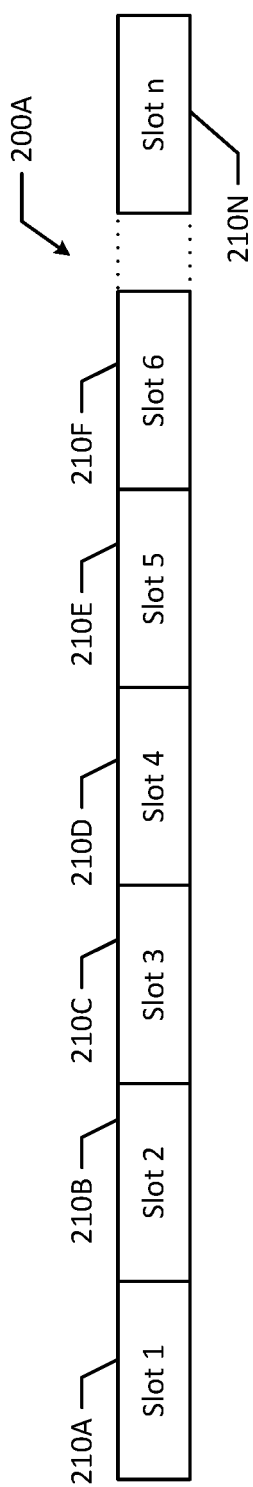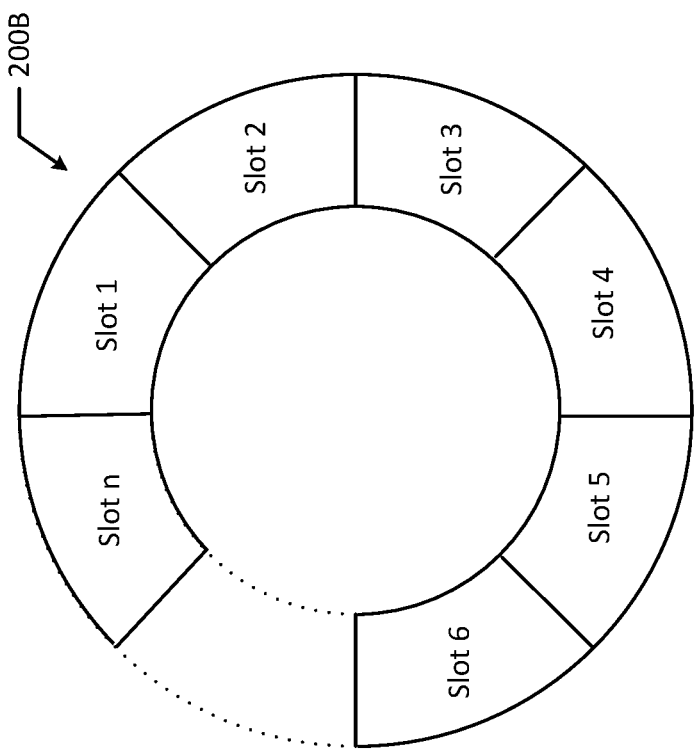
FIG. 2A
FIG. 2B

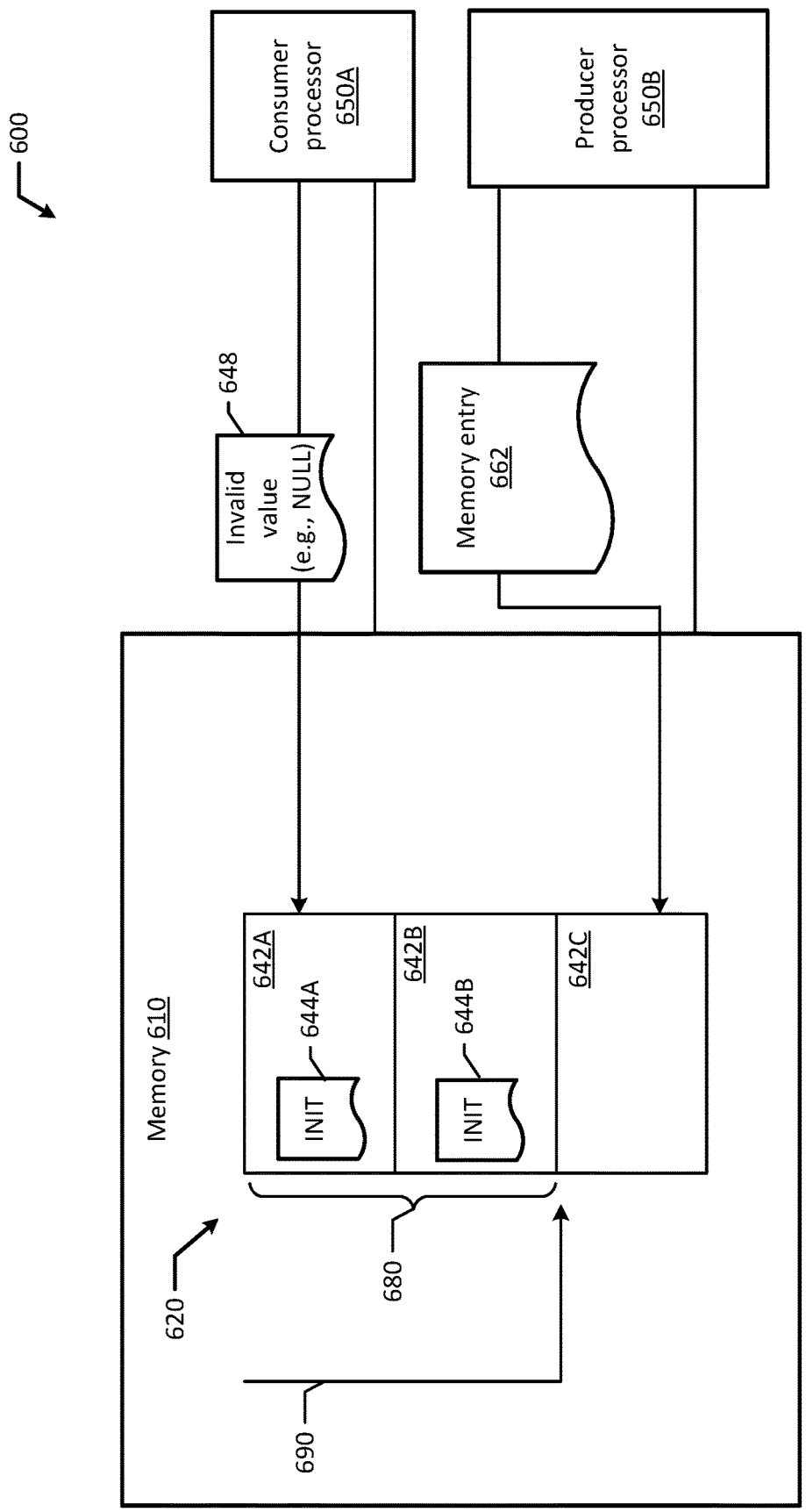

US 12,079,133 B2

MEMORY CACHE-LINE BOUNCE REDUCTION FOR POINTER RING STRUCTURES

BACKGROUND

Computer systems may routinely copy memory entries from one memory to a different memory. For example, while forwarding incoming networking traffic to a physical or virtual machine, packets may be received and later copied to another memory location. Processors may execute instructions to read, write, and copy memory entries, such as packet addresses to forward networking traffic to different machines. For example, memory entries may be temporarily stored in ring buffers on a first-in-first-out basis before being copied to the memory associated with a different machine. Specifically, incoming networking traffic may be stored on a ring buffer and later copied to virtual machine memory.

SUMMARY

The present disclosure provides new and innovative systems and methods for memory cache-line bounce reduction for memory rings. In an example, a system includes a memory including a ring buffer having a plurality of slots and at least one processor in communication with the memory. A subset of the plurality of slots are initialized with an initialization value. Additionally, the at least one processor includes a consumer processor and a producer processor. The producer processor is configured to receive a memory entry, identify an available slot in the ring buffer for the memory entry, and store the memory entry in the available slot at an offset in the ring buffer. The initialization value is interpreted as an unavailable slot by the producer processor. The consumer processor is configured to consume the memory entry and invalidate one of the subset of slots in the ring buffer by overwriting the initialization value with an invalid value to transition the one of the subset of slots from an unavailable slot to an available slot.

In an example, a method includes receiving, by a producer processor, a memory entry. Additionally, the producer processor identifies an available slot in a ring buffer having a plurality of slots. A subset of the slots is initialized with an initialization value, and the initialization value is interpreted as an unavailable slot by the producer processor. The producer processor also stores the memory entry in the available slot at an offset in the ring buffer. Additionally, the method includes consuming, by a consumer processor, the memory entry, and invalidating, by the consumer processor, one of the subset of slots in the ring buffer by overwriting the initialization value with an invalid value to transition the one of the subset of slots from an unavailable slot to an available slot.

In an example, a method includes receiving, by a producer processor, a plurality of requests associated with a plurality of respective memory entries. The producer processor stores each of the plurality of requests in a respective slot that contains an invalid value. The producer processor is prevented from storing a request in a slot occupied by a valid value and is prevented from storing a request in a slot occupied by an initialization value. The method also includes processing, by a consumer processor, each of the plurality of requests. Additionally, the consumer processor invalidates one of a plurality of respective slots for each of the plurality of stored requests by first invalidating a first slot initialized with an initialization value for a first stored request of the plurality of stored requests. Each of the plurality of respective slots includes one of an initialization value and a valid value.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 2A illustrates a block diagram of an example memory ring according to an example embodiment of the present disclosure.

FIG. 2B illustrates a block diagram of an example memory ring according to an example embodiment of the present disclosure.

FIG. 6 illustrates a block diagram of an example pointer ring structure submission system according to an example embodiment of the present disclosure.

DETAILED DESCRIPTION OF EXAMPLE EMBODIMENTS

Figure 1:
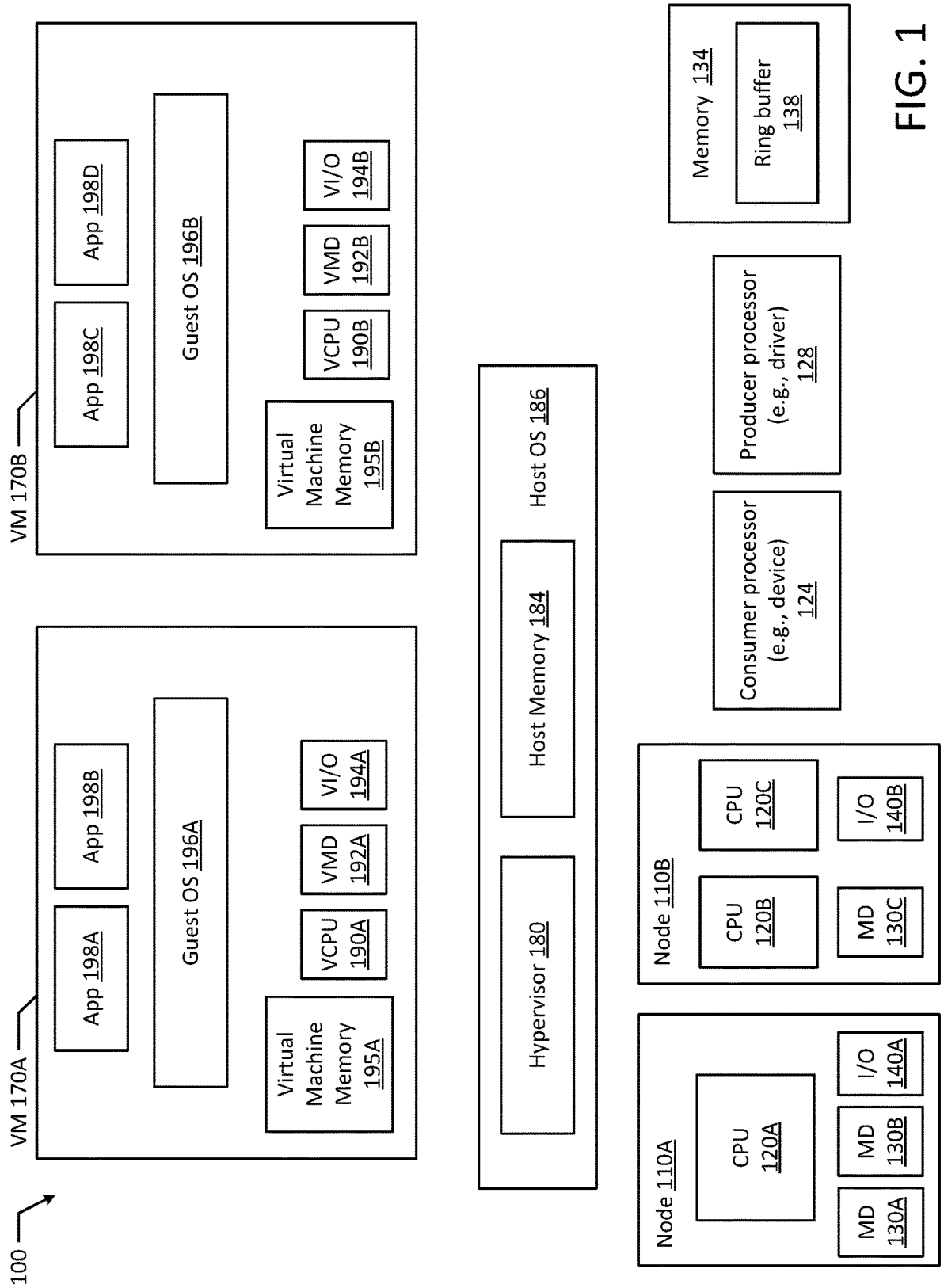
FIG. 1 illustrates a block diagram of an example computing system according to an example embodiment of the present disclosure.

Techniques are disclosed for memory cache-line bounce reduction for memory ring structures (e.g., pointer rings) when receiving data and processing data. For example, the data may be processed and/or copied from one memory location (e.g., ring buffer) to a different memory. Specifically, the techniques disclosed may be used when receiving network traffic and forwarding incoming network traffic to a virtual machine by a hypervisor, which may include receiving a packet from a network device and copying the packet to virtual machine memory. Specifically, forwarding incoming network traffic to a virtual machine by the hypervisor may involve receiving a packet or request (e.g., disk write requests) from a network interface controller ("NIC") in hypervisor memory (e.g., producing the packet) and copying the packet (or executing the request to write an address of the packets associated with the requests) to virtual machine memory (e.g., consuming the packet).

The techniques disclosed may be used when receiving disk write requests for incoming or outgoing network traffic, for example when processing or executing disk write requests to transmit network traffic (e.g., network traffic from a cloud computing platform) such as a data packet to or from virtual devices (e.g., a virtual machine). A guest operating system or associated guest driver may receive disk write requests and execute the requests such that a hypervisor can transmit the processed requests (e.g., packets) to/from virtual machines ("VMs") by copying memory entries from a ring buffer and transmitting the memory entries to virtual machine memory. Virtualization may allow a host machine to run multiple virtual environments, for example using a hypervisor (e.g., Kernel-based Virtual Machine ("KVM")) on an operating system, such as Red Hat® Enterprise Linux® ("RHEL"). The hypervisor may implement software devices and/or virtual devices. When handling network traffic (e.g., network traffic from a cloud computing platform such as the Red Hat® OpenStack® Platform), hypervisor vendors and operating system ("OS") vendors often attempt to improve networking speed for hypervisors for use in networking stacks as well as improving performance of the associated virtual and physical devices. An example vendor is Red Hat®, which offers RHEL.

The act of receiving the data (e.g., packets) and copying the data may be executed on the same processor (e.g., central processing unit "CPU"), however, parallelizing the actions on separate processors or separate processor cores may provide significant performance advantages and may potentially double the throughput, for example. However, because the parallel process utilizes two CPUs, the process adds additional overhead as adding and removing packets on one list requires cross-CPU communication through shared memory. Traditionally, a linked list or a producer/consumer ring was used without much added performance as false cache sharing typically outweighed the benefits of parallelism. For example, false cache sharing is a performance-degrading usage pattern resulting from periodically accessing data that one of the CPUs (e.g., a first CPU) will not alter (e.g., unaltered data) and the unaltered data shares a cache block or cache line with data that is altered. Because the unaltered data shares a cache block or cache line with altered data, a caching protocol may force the other CPU (e.g., a second CPU) to reload the whole unit of data even though much of the data remains unchanged or unaltered. Thus, the second CPU bears the caching overhead associated with the reload to maintain shared access of the resource (e.g., linked list or a producer/consumer ring). Specifically, if two processors operate on independent data in the same memory address region storable in a single cache line, the entire cache line may have to be refreshed causing memory stalls in addition to wasting system bandwidth.

Additionally, other approaches such as a typical circular buffer design often creates cache line bounces between the two CPUs or CPU cores (e.g., a first CPU or core associated with a hypervisor and a second CPU or core associated with a guest OS). The processor associated with the guest OS (e.g., producer processor) may increment a pointer to address the next slot, thereby wrapping around at the end of the array. To avoid overruns, before storing the data and marking the data (e.g., the address of each packet and/or packet) as valid, the guest OS may test the value in each slot. If the descriptor value is valid, then unconsumed data (e.g., previously stored data) exists in the slot and the data intended to be stored in the circular buffer is not stored in the list at that time and may be discarded. The processor associated with a hypervisor (e.g., consumer processor), which may be referred to as a data copying processor, may maintain a consumer pointer. The hypervisor may test the value pointed to by the consumer pointer. If the descriptor value has been cleared and is invalid, then the array is empty and the hypervisor may stop and wait for more packet entries marked valid for transmission. If the descriptor value is valid, the hypervisor may retrieve the data, such as a packet address. Then, the hypervisor may clear the valid descriptor and may advance the consumer pointer to the next slot. The retrieved data may be copied to a second memory location (e.g., virtual machine memory).

Clearing a valid descriptor or slot (e.g., overwriting the valid bit or storing a NULL value in a slot) advantageously allows reuse of the slot for additional data (e.g., forwarding a new packet). For example, typically multiple requests fit in a single cache-line and as a requester or producer (e.g., driver) attempts to produce another request while the previous request is overwritten with a NULL value by the consumer (e.g., device), both the producer (e.g., driver) and the consumer (e.g., device) may end up writing into the same cache-line, which causes a cache-line bounce.

Specifically, this data structure may experience performance bottlenecks. For example, when consuming packets is slower than producing packets for transmission or conversely when producing packets is slower than consuming packets. In the first case, the ring may be full for a large part of the time, and as a result, as the hypervisor signals completion of an entry or the producer process produces an entry, the entry is immediately made valid again by the interrupt handling processor (e.g., the consumer processor processes the entry and invalidates a slot to make the slot available), which causes a cache line to bounce between the processors and results in a significant slowdown. Similarly, when the ring is empty for a large part of the time, as the consumer processor makes a slot available (e.g., the slot is immediately accessed by the consumer processor, consumed and signaled as complete by storing a NULL value in the slot). Due to the bottleneck and resulting slowdown, the producer processor and consumer processor may be unable to achieve sufficient separations, resulting in cache line bounces for each data operation in the ring buffer.

As described in the various examples disclosed herein, to reduce the frequency of cache-line bounces and prevent slowdown, the ring configuration may be augmented and initialized with a subset of slots to include initialization values (e.g., INIT values). The ring buffer or memory ring (e.g., pointer ring) may be modified and made larger based on a quantity of outstanding entries "N" (e.g., a typical size of pointer ring) and a quantity of pointers in a cache-line "C". For example, a ring buffer or memory ring may be allocated with a size of "N+C−1". In an example, eight pointers may fit in a cache-line resulting in seven extra entries that may be added to a typical ring size. For a ring that is designed to handle 16 requests or has 16 slots (e.g., "N=16"), the ring size may be augmented by seven slots resulting in a ring size of 23 slots (e.g., 16+8−1=23). In the example illustrated in FIGS. 3A and 3B, the augmented ring buffer or memory ring 300 includes seven slots (e.g., slots 305A-G) and a typical cache-line may be four slots.

Specifically, the ring is augmented such that the memory area is larger than the area required to hold a maximum number of outstanding requests (e.g., 16). The ring may be initialized with initialization values (e.g., 'INIT' values) in the extended or enlarged area. The initialization values are interpreted as an unavailable slot by the producer processor (e.g., the producer processor interprets or perceives an initialization value as an unconsumed valid memory entry). The consumer processor may interpret or perceive the initialization values as a previously consumed value (e.g., a slot that can be invalidated and made for reuse by overwriting the 'INIT' value with a NULL value). During request processing, the active requests or newly produced memory entries are stored at an offset, ahead of the slots initialized with the 'INIT' values. For example, four 16 byte requests may fit in a 64 byte cache-line. The active requests or newly produced requests may be stored at an offset of at least 48 bytes, and the processed requests (or consumed requests) may be consumed and a previously consumed request or 'INIT' value stored at an offset of 0 bytes (e.g., the active requests or newly produced memory entries may be stored at least 3 slots ahead of the processed or consumed requests). Therefore, when a single new request is added to the ring, the next request will be written at an offset of 64 bytes (e.g., 48 bytes+16 bytes), which is in a different cache-line from where the processed requests are written (e.g., where slots are invalidated and NULL values are written in the ring by the consumer processor). Augmenting the ring and initializing the ring with some initialization values creates and maintains a spacing between the consumer processor and the producer processor, which prevents the cache-line from moving or bouncing multiple times in and out of the cache of one or more of the processors or CPUs. Preventing cache-line bouncing advantageously increases performance, especially for low latency applications (e.g., applications that process high volumes of data with minimal delay) by further increasing the throughput or volume of data that can be passed through the system without incurring any additional cache-line bouncing delays, which helps to minimize latency.

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-B), a consumer processor (e.g., device) 124, a producer processor (e.g., driver) 128, and memory 134 including a ring buffer 138. Ring buffer 138 may be a data structure using a single, fixed-size buffer as if it were connected end-to-end (e.g., in a ring). In an example, the ring buffer 138 may be a first-in-first-out (FIFO) data structure. For example, requests associated with memory entries such as packet addresses may be written into and retrieved from the ring buffer 138 based on when the request was first produced to the ring buffer 138. Additionally, the ring buffer 138 may have a plurality of slots, which may store memory entries. The slots may be tracked by pointers or indices, or through the use of a counter. In an example, the counter may be configured to track a position of a current slot accessed by the producer processor 128, the consumer processor 124, or both the producer processor 128 and consumer processor 124. Other methods may be used to prevent either the consumer processor (e.g., device) 124 or the producer processor (e.g., driver) from over-writing ring entries while the ring is full. For example, the producer processor 128 may use a counter or a pointer to wrap around the ring buffer 138 while avoiding over-writing active ring entries while the ring is full (at least until some are processed by the consumer processor 124).

Virtual machines 170A-B may include a guest OS, guest memory, a virtual CPU (VCPU), virtual memory devices (VMD), and virtual input/output devices (VI/O). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

The computing system 100 may also include a hypervisor 180 and host memory 184. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

In an example, a virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186A. In an example, a device may be implemented as a virtual machine (e.g., virtual machine 170A-B).

The computer system 100 may include one or more nodes 110A-B. Each node 110A-B may in turn include one or more physical processors (e.g., CPU 120A-C) communicatively coupled to memory devices (e.g., MD 130A-C) and input/output devices (e.g., I/O 140A-B). Each node 110A-B may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

In an example, consumer processor (e.g., device) 124 and producer processor (e.g., driver) 128 may be one of the other processor(s) illustrated in FIG. 1, such as a CPU (e.g., CPU 120A-C) on node 110A-B. Similarly, ring buffer 138 may be stored in a memory device, and may be one of the other memory(s) illustrated in FIG. 1, such as MD130A-C on node 110A-B. Additionally, consumer processor 124 and producer processor 128 may be different cores on the same physical processor. The producer processor 128 may be configured to receive one or more requests (e.g., memory entries) and store the requests or associated memory entries in the ring buffer 138 at a first offset (e.g., in the slots initialized with invalid values or NULL values ahead of the slots initialized with initialization values or 'INIT' values). In an example, the offset may be a slot that is indicated by a pointer. The producer processor 128 may receive and produce the next request in the next successive slot after the first produced request. The consumer processor 124 may be configured to consume and process the requests and invalid a slot for each processed request. The consumer processor 124 may write the NULL value associated with the processed requests at a second offset in the ring buffer 138 (e.g., at an offset of '0' at the start of the ring or the first slot initialized with an 'INIT' value).

By producing requests (e.g., memory entries) at the first offset and writing processed or consumed memory entries at the second offset, a spacing is created between the producer processor 128 and the consumer processor 124 and cache-line bounces are prevented. Specifically, memory operations can be handled by both the producer processor and consumer processor without a cache-line bounce thereby improving performance (e.g., reduced latency and increased throughput).

As used herein, physical processor or processor 120A-C, 124, and 128 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120A-C and a memory device 130A-C may be provided by one or more local buses of suitable architecture, for example, peripheral component interconnect (PCI).

FIGS. 2A and 2B illustrate block diagrams of example ring buffers 200A and 200B (generally referred to as ring buffer 200). For example, FIG. 2A illustrates a linear buffer implementation of ring buffer 200A while FIG. 2B illustrates the "ring" structure of ring buffer 200B. It should be appreciated that ring buffers 200A-B may be the same actual memory structure illustrated in two different ways. Ring buffers 200A-B may in be located in cacheable memory, such as L1 cache if on the same physical processor but on different CPU cores. In another example, the ring buffer 200A-B may be on a different level of cache other than L1. Additionally, ring buffers 200A-B may include a plurality of slots (e.g., slots 210A-N). For example, slots 210A-N may correspond to Slot_1 to Slot_n respectively. Each slot may include a request or memory entry, such as a data packet, a packet address, or the like. Additionally, slots may be initially empty or may include an invalid value, such as "0". For example, a slot with a memory address of "0" may be used to indicate an empty slot or invalid slot. Conversely, a valid slot may include a request or memory entry, such as a data packet or a packet address.

Figure 3A:
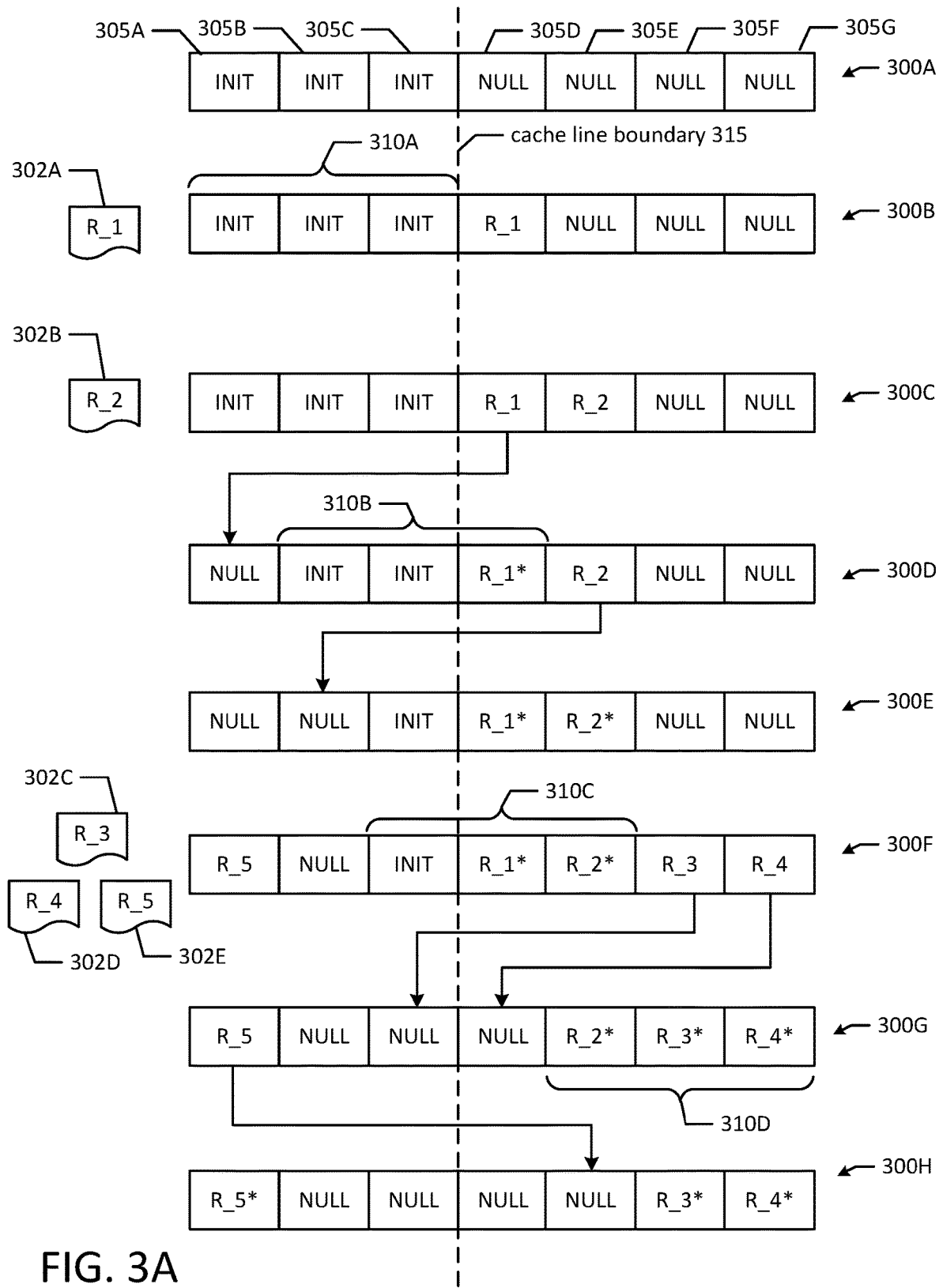
FIGS. 3A and 3B illustrate a block diagram of request processing in an example pointer ring structure.
Figure 3B:
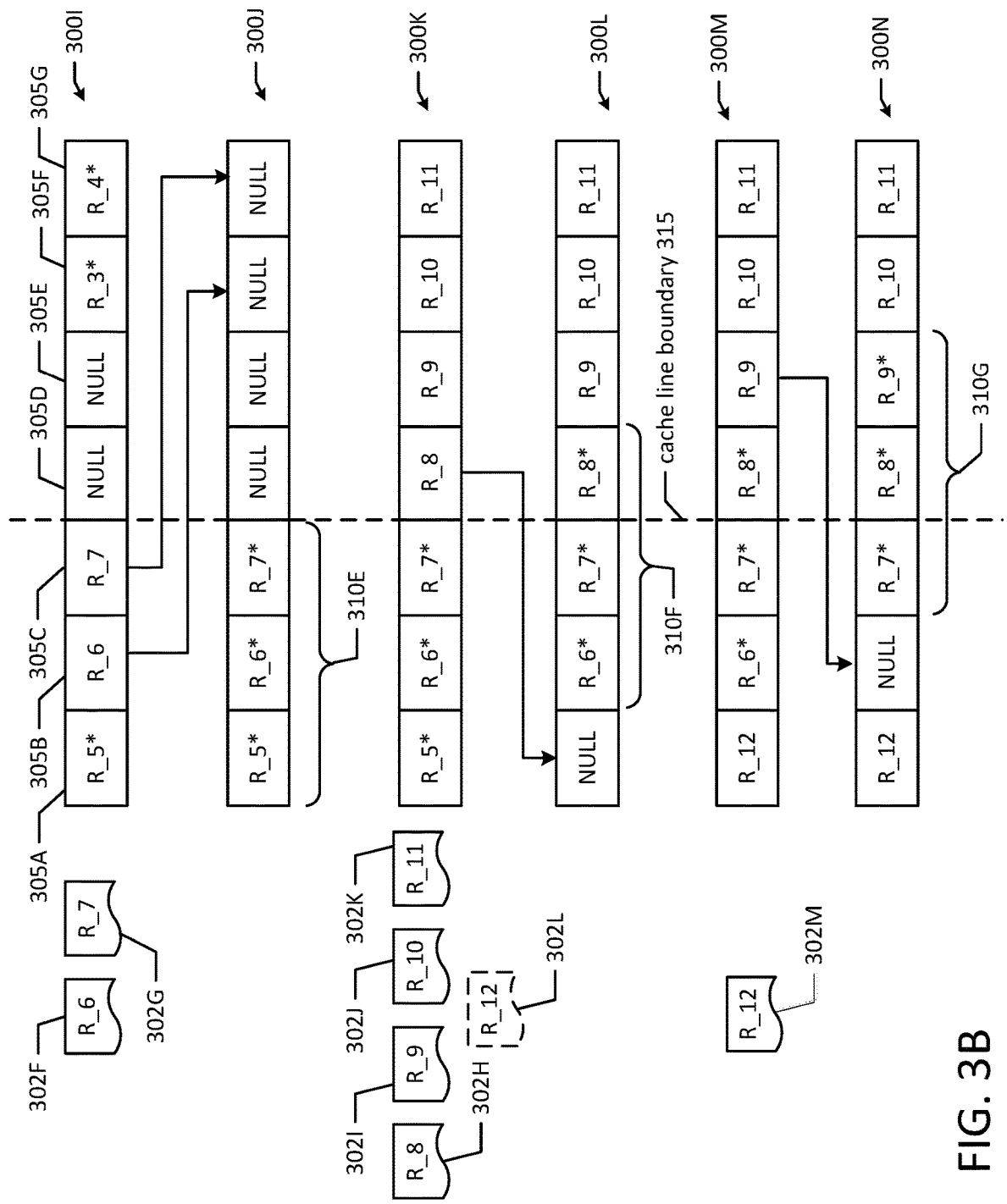

FIGS. 3A and 3B illustrate a block diagram of request processing in an example memory ring (e.g., pointer ring), such as ring buffer 138 or 300A-N (generally referred to herein as shared ring buffer 200, 300). For example, memory ring 300 is illustrated as 300A-N, which represents different states of memory ring 300 at different points in time. Memory ring or ring buffer 300 may include seven slots (e.g., slots 305A-G). In an example, each slot may include a memory entry, such as a request 'R_1' to 'R_12', a non-valid or invalid value or an initialization value. An invalid value may be a zero value or a NULL value and changing a valid value to an invalid value may include changing a valid packet length to an invalid packet length, etc. The initialization value may be a predetermined value that is selected such that the initialization value is recognized by a consumer as non-valid or invalid, but is recognized by the producer as valid. In an example, the initialization value may be "1", which is typically not recognized as a valid pointer value.

The ring buffer or memory ring 300 (e.g., pointer ring) may be modified and made larger based on a quantity of outstanding entries "N" and a quantity of pointers in a cache-line "C". For example, a ring buffer or memory ring 300 may be allocated with a size of "N+C−1". In a typical scenario, eight pointers may fit in a cache-line, seven extra entries may be added to a typical ring size. For example, with a cache-line than can accommodate eight pointers or eight slots of the ring (e.g., "C=8"), and a ring buffer or memory ring 300 that is typically designed to handle 16 requests (e.g., "N=16"), the ring size may be augmented by seven slots resulting in a ring size of 23 slots (e.g., 16+8−1=23). In the example illustrated in FIGS. 3A and 3B, the augmented ring buffer or memory ring 300 includes seven slots (e.g., slots 305A-G) and a typical cache-line may be four slots.

Requests or memory entries, such as packets (e.g., requests 302A-K) may be received by producer processor 128. After one or more requests are received, the producer processor 128 may start producing the requests at a later time. In an example, the request may be addresses, such as packet address 'P_1' to 'P_12'. As illustrated in ring buffer 300A, which is illustrated with four slots per cache-line, the ring is provided with three additional slots (e.g., slots 305A-C), which are initialized with an initialization value and the remaining slots (e.g., slots 305D-G) are initialized with an invalid value (e.g., NULL value). At 300B, a request 302A (e.g., 'R_1') is received and is written at the first invalid value slot (e.g., slot 305D). For example, 305D includes request 302A (e.g., 'R_1') and the other slots (e.g., slots 305A-C) have initialization values (e.g., 'INIT' values) and slots 305E-G) include an invalid value, such as a NULL value. The request 302A (e.g., 'R_1', which may be a packet address) may be written into the memory ring or ring buffer 300 by a producer processor, such as producer processor 128. In the illustrated example, a cache-line may occupy four slots or 64 bytes, such that slots 305A-C partially occupy a first cache-line and slots 305D-G are in a second cache-line (e.g., slots 305D-G fully occupy the second cache-line), which are illustrated as being separated by cache-line boundary 315. The producer processor 128 may store request 302A (e.g., 'R_1') at an offset after the initialization values (e.g., 'INIT' values) such that the request 'R_1' is written over the first invalid value or NULL value (e.g., at an offset of '48' bytes), which positions the request in slot 305D, of the ring buffer 300. By initializing the ring buffer 300 with initialization values (e.g., 'INIT' values) and producing the first request (e.g., 'R_1') in the first available slot after the initialization values (e.g., in the first 'NULL' slot), a spacing 310A is advantageously created to reduce cache-line bouncing between the producer processor 128 and consumer processor 124 about cache-line 315.

For VMs, the producer processor 128 may be a guest of the VM, which may program the request data 'R_1' (e.g., request 302A such as a packet address) into the ring buffer 300. The ring buffer 300 may be associated with a virtual device and accessible to the hypervisor 180. Similarly for physical systems, the producer processor 128 may be a device driver, which may program the request data 'R_1' (e.g., request 302A such as a packet address) into the active ring buffer 300. Additionally, the ring buffer may be accessible to a device (e.g., consumer processor 124). As the requests are processed by the consumer processor 124, other slots are invalidated or overwritten with a NULL value to indicate that a request has been processed. For example, the processed requests (e.g., 'R_1*') may later be invalidated or overwritten with NULL values from subsequently consumed requests.

Then, in 300C, the producer processor 128 may receive another request 302B (e.g., 'R_2') and may write the request in the next successive slot (e.g., slot 305E), which is adjacent to the previously produced request 'R_1' in slot 305D.

The consumer processor 128 may start looking for new entries at the same offset (e.g., offset of "C−1=3 slots or '48' bytes) because the consumer processor 128 is recognized by the consumer processor 128 as a non-valid or invalid value (e.g., NULL) processes requests when a valid value is encountered (e.g., the valid value of 'R_1' produced in slot 305D). For example, in 300D, the consumer processor 128 may process the request 302A (e.g., 'R_1') and write an invalid value (e.g., NULL value) at an offset of '0' bytes at the start of the ring buffer 300, which positions the invalid value (e.g., NULL value) associated with the processed request 302A (e.g., 'R_1*') in slot 305A in a different cache-line than the slots 305D-E for requests 'R_1' and 'R_2' that were last produced by producer processor 128. The spacing 310B of three slots that are either 'INIT' values or processed requests is maintained, which includes two 'INIT' values and the processed request 'R_1*.' Each of the slots within the spacing 310B are perceived by the producer processor 128 to be unavailable (e.g., full or occupied). A request (e.g., 'R_1') may retain its value as it is processed and written as a processed request (e.g., 'R_1*') such that both values of 'R_1' and 'R_1*' are the same.

For example, slot 305A is a full cache-line behind slots 305D-E, and thus writing the NULL value in slot 305A prevents a cache-line bounce between the producer processor 128 and the consumer processor 124. As indicated in FIGS. 3A and 3B, after a request has been consumed, the entry is denoted with an asterisk to indicate that the consumer processor 124 has consumed the request and written an invalid value (e.g., NULL value) into the ring buffer 300.

The processed requests may be copied to another location, for example consuming or processing a request may include copying the request (e.g., packet data) to another memory location, such as VM memory 195A. For example, the consumer CPU 124 may retrieve packet address associated with the request and then copy the packet associated with packet address to VM memory 195A.

Similarly, the consumer processor 124 may process the request 302B (e.g., 'R_2') and write an invalid value (e.g., NULL value) in slot 305B, which is the next successive slot, which positions the invalid value (e.g., NULL value) associated with the processed request 302B (e.g., 'R_2*') in slot 305B in a different cache-line than the slots 305D-E for requests 'R_1' and 'R_2' that were last produced by producer processor 128. The consumer processor 124 writes the invalid values (e.g., NULL values) into slots by overwriting valid values or values that are perceived as valid values (e.g., 'INIT' values).

The producer processor 128 may then receive requests 302C, 302D and 302E. Additionally, the producer processor 128 may produce the request in slots 305F, 305G and 305A respectively. The producer processor 128 may produce the requests one-by-one or may produce the requests in batches. For example, the producer processor may first produce request 302C (e.g., 'R_3') in slot 305F and then produce request 302D (e.g., 'R_4') in slot 305G, which are a full cache-line ahead of slots 305A and 305B, and thus prevents a cache-line bounce between the producer processor 128 and the consumer processor 124. Then, the producer processor 128 may wrap-around and produce request 302E (e.g., 'R_5') in slot 305A. The producer processor 128 may continue producing requests to the ring buffer 300 until it reaches a valid entry or an entry the producer processor 128 perceives as a valid entry (e.g., 'INIT' value) thereby maintaining the spacing 310C of the three slots.

As illustrated in ring buffer 300F, the consumer processor 124 processes the requests 302C and 302D (e.g., 'R_3' and 'R_4') and write invalid values (e.g., NULL values) in slots 305C and 305D respectively, which are the next successive slots after the previous NULL entry that was written in slot 305B. As discussed above, the processed requests are denoted as ('R_3*' and 'R_4*'). Then, at 300G, the consumer processor 124 consumes request 302E and overwrites the previously processed request (e.g., 'R_2*') in slot 305E with a NULL value, as illustrated in 300H. At 300G, the spacing 310D includes slots 305E-G, which each include consumed requests 'R_2*', 'R_3*' and 'R_4*.' Since each of the slots 305E-G within the spacing 310D include requests (e.g., consumed requests), the producer processor 128 is prevented from producing new requests in these slots until they are later invalidated by the consumer processor 124. By maintaining the spacing 310D between the consumer processor 124 and producer processor 128, the occurrence of cache-line bounces about cache-line boundary 315 are advantageously reduced and in some instances entirely prevented.

Continuing on FIG. 3B, at 3001 the producer processor 128 receives requests 302F and 302G (e.g., 'R_6' and 'R_7') and produces the requests in slots 305B and 305C, which were previously occupied by NULL values. Again, the consumer processor 124 processes the requests and writes an invalid value (e.g., NULL value) in slots 305F and 305G by overwriting the previously processed requests 'R_3*' and 'R_4*'. As discussed above, a cache-line may occupy four slots or 64 bytes, such that slots 305D-G are in one cache-line and slots 305A-C are in a different cache-line. For example, at 300J, the entire second cache-line (e.g., slots 305D-G) includes NULL values and the first cache-line, which is partially occupied by slots 305A-C includes processed requests 'R_5*', 'R_6*' and 'R_7*', which form the spacing 310E.

The producer processor 128 may receive another batch of requests 302H-L (e.g., 'R_8' through 'R_12'). As shown in 300K, the producer processor produces requests 302H-K (e.g., 'R_8', 'R_9', 'R_10' and 'R_11') in each of the slots that include a NULL value (e.g., slots 305D-G). As discussed above, the producer processor 128 may continue producing requests to the ring buffer 300 until it reaches a valid entry or an entry the producer processor 128 perceives as a valid entry (e.g., 'INIT' value). In the illustrated example, slot 305A includes a valid entry (e.g., 'R_5*') and thus the producer processor 128 is prevented from producing another entry until the consumer processor 124 makes progress and overwrites the 'R_5*' value with a NULL value. The processed requests 'R_6*', 'R_7*' and 'R_8*' maintain the spacing 310F between the consumer processor 124 and the producer processor 128 since the producer processor 128 is prevented from producing additional requests to the ring buffer 300 until the consumer processor 124 consumes additional entries.

In an example, the unproduced request 302L from the batch may be returned to the user. For example, request 302L is shown in a dotted-line at 300K since the request is produced at a later time. In the illustrated example, the request 302L is held and produced at a later time as request 302M.

The consumer processor looks for the newly produced entries (e.g., 'R_8' through 'R_11') and consumes the entries. For example at 300K and 300L, request 302H (e.g., 'R_8') is consumed and the value in slot 305A is overwritten with an invalid value (e.g., NULL value). After slot 305A becomes available for production, the producer processor 128 may produce request 302M (e.g., 'R_12') into the slot as illustrated at 300M. Then, the consumer processor 124 may continue consuming requests and consume request 302I, which is indicated by overwriting the value in slot 305B (e.g., 'R_6*') with a NULL value at 300N while the spacing 310G is maintained.

As mentioned above, the producer processor 128 and consumer processor 124 may store and write processed requests one-by-one or in batches. Since slots 305A-C and slots 305D-G are in different cache-lines, the consumer processor 124 and producer processor 128 may produce and consume requests (in parallel or even simultaneously) without causing a cache-line bounce between the consumer processor 124 and the producer processor 124. Additionally, because the ring buffer 300 was initialized with three initialization values (e.g., 'INIT' values), the 'INIT' values create and maintain a spacing between the consumer processor 124 and producer processor 128 to prevent cache-line bouncing.

Figure 4A:
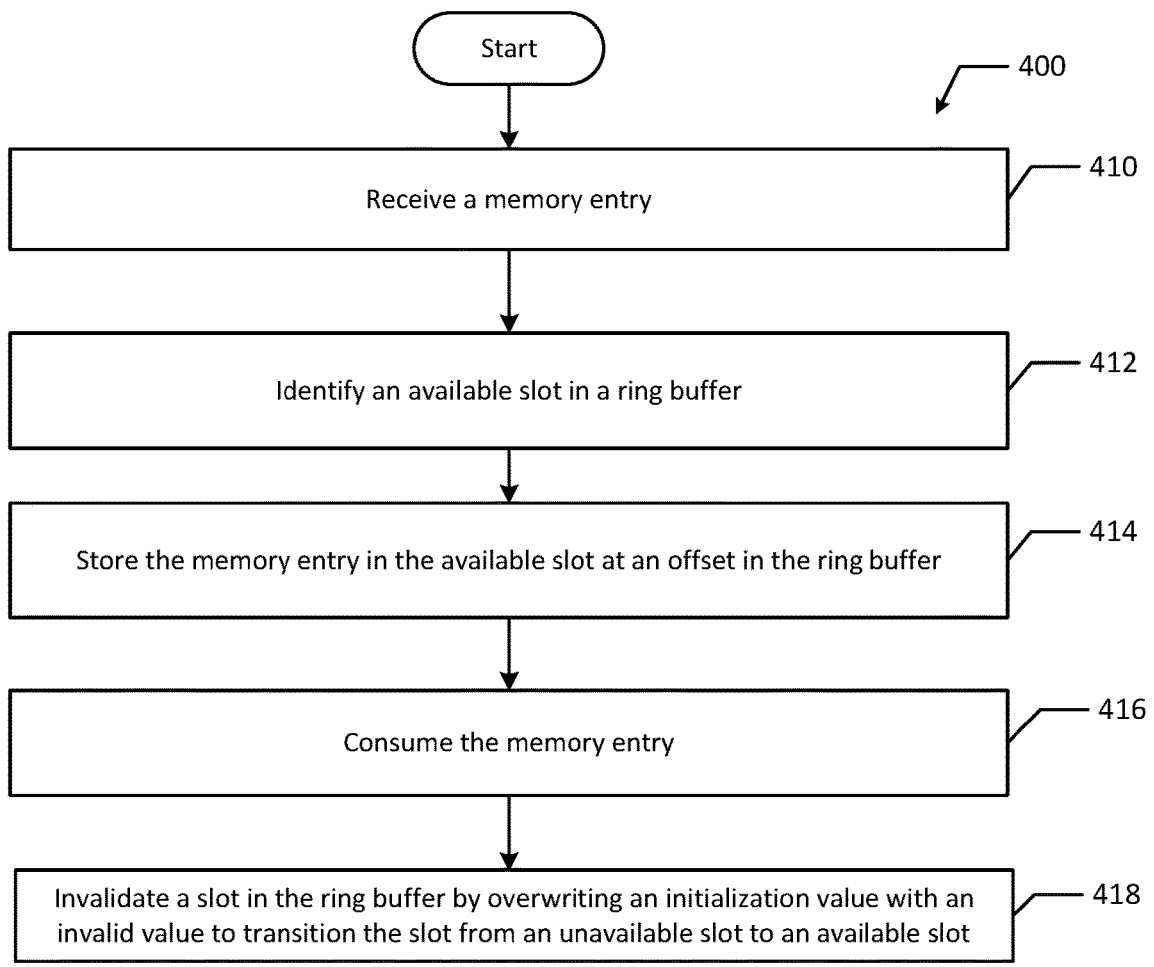
FIG. 4A illustrates a flowchart of an example process for memory cache-line bounce reduction in a memory ring according to an example embodiment of the present disclosure.

FIG. 4A illustrates a flowchart of an example method 400 for memory cache-line bounce reduction in a memory ring according to an example of the present disclosure. Although the example method 400 is described with reference to the flowchart illustrated in FIG. 4A, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes receiving a memory entry (block 410). For example, a producer processor 128 may receive a memory entry or a request associated with a memory entry (e.g., a packet). In an example, the memory entry may be a data packet. Then, the method includes identifying an available slot in a ring buffer (block 412). For example, the producer processor 128 may identify an available slot in the ring buffer 138 (e.g., ring buffer 200 of FIGS. 2A and 2B or ring buffer 300 of FIGS. 3A and 3B) that has a plurality of slots. In an example, a subset of the slots is initialized with an initialization value (e.g., 'INIT' value), which may be interpreted or perceived as an unavailable slot by the producer processor 128. The method also includes storing the memory entry in the available slot at an offset (block 414). For example, the producer processor 128 may store the memory entry or request associated with a memory entry in a slot provided at an offset in the ring buffer 138. The slot may be an available slot that includes an invalid value, such as a NULL value.

Then, the method includes consuming the memory entry (block 416). For example, the memory entry may be consumed (e.g., processed) by a consumer processor 124 similar to what has been described and illustrated in FIGS. 3A and 3B. Additionally, method 400 includes invalidating a slot in the ring buffer by overwriting an initialization value with an invalid value to transition the slot from an unavailable slot to an available slot (block 418). For example, the consumer processor 124 may invalidate one of the subset of slots in the ring buffer 138, which was previously initialized with an initialization value (e.g., 'INIT' value) by overwriting the 'INIT' value with an invalid value to transition the one of the subset of slots from an unavailable slot to an available slot. In an example, the slot initialized with the initialization value may be at a different offset in the ring buffer (e.g., an offset of '0'). The slot(s) initialized with initialization values may be predetermined such that the producer processor 128 and the consumer processor 124 maintain a spacing while producing and consuming memory entries in the ring buffer to avoid cache-line bounces.

Figure 4B:
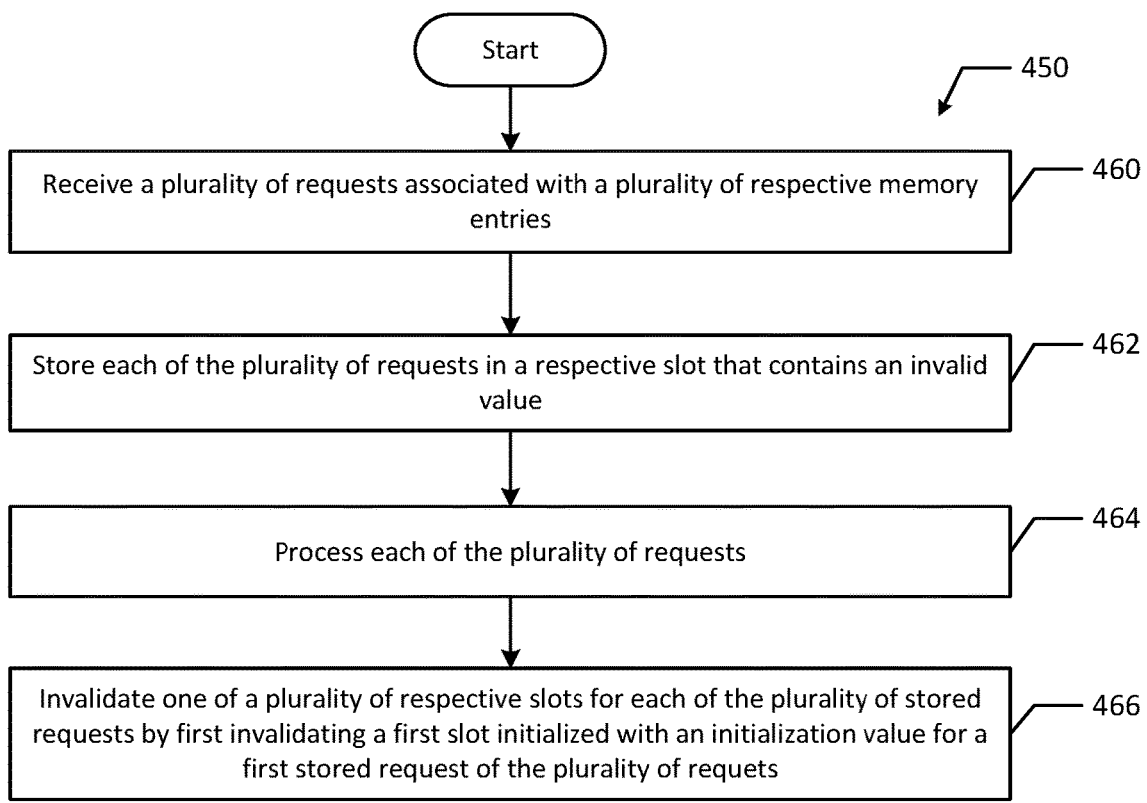
FIG. 4B illustrates a flowchart of an example process for memory cache-line bounce reduction in a memory ring according to an example embodiment of the present disclosure.

FIG. 4B illustrates a flowchart of an example method 450 for memory cache-line bounce reduction in a memory ring according to an example of the present disclosure. Although the example method 450 is described with reference to the flowchart illustrated in FIG. 4B, it will be appreciated that many other methods of performing the acts associated with the method 450 may be used. For example, the order of some of the blocks may be changed, certain blocks may be combined with other blocks, and some of the blocks described are optional. The method 750 may be performed by processing logic that may comprise hardware (circuitry, dedicated logic, etc.), software, or a combination of both.

The example method 450 includes receiving a plurality of requests associated with a plurality of respective memory entries (block 460). Requests may be received individually or received in batches. Then the method includes storing each of the plurality of requests in a respective slot that contains an invalid value (block 462). The producer processor 128 may store the request in the first slot, which may be an intermediate slot in the ring buffer at an offset spaced from the start of the ring buffer (e.g., a slot after the slots initialized with 'INIT' values). The method includes processing each of the plurality of requests (block 464). For example, a consumer processor 124 may process each of the requests. Then, the method includes invalidating one of a plurality of respective slots for each of the plurality of stored requests by first invalidating a first slot initialized with an initialization value for a first stored request of the plurality of requests (block 466). The ring buffer being augmented and initialized with some slots with initialization values creates a spacing and the spacing may be adapted such that the consumer processor 124 and the producer processor 128 can perform memory operations on different cache-lines in parallel or simultaneously, without causing a cache-line bounce.

Figure 5A:
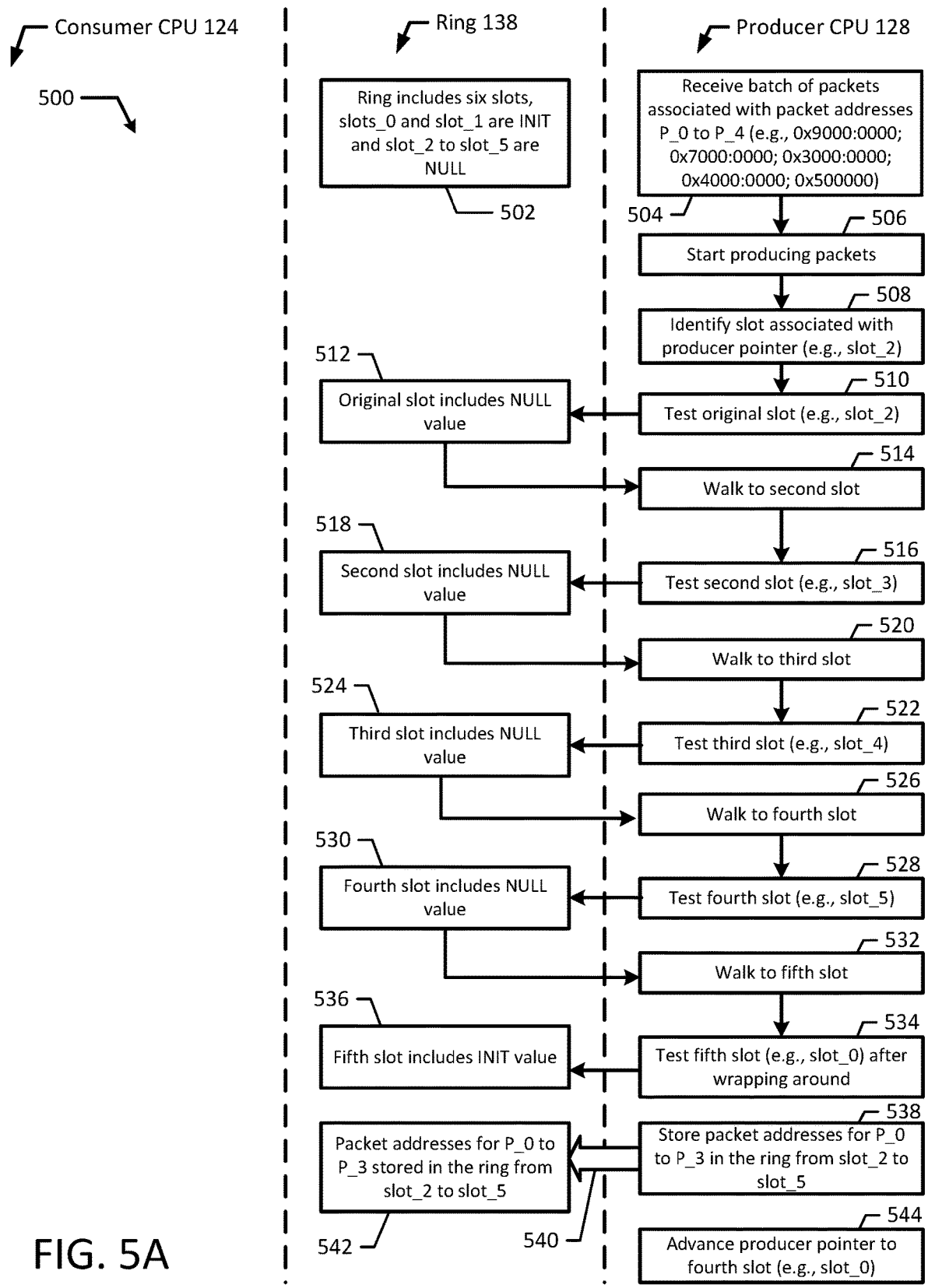
FIGS. 5A, 5B and 5C illustrate a flow diagram of an example process for memory cache-line bounce reduction in a pointer memory ring according to an example embodiment of the present disclosure.
Figure 5B:
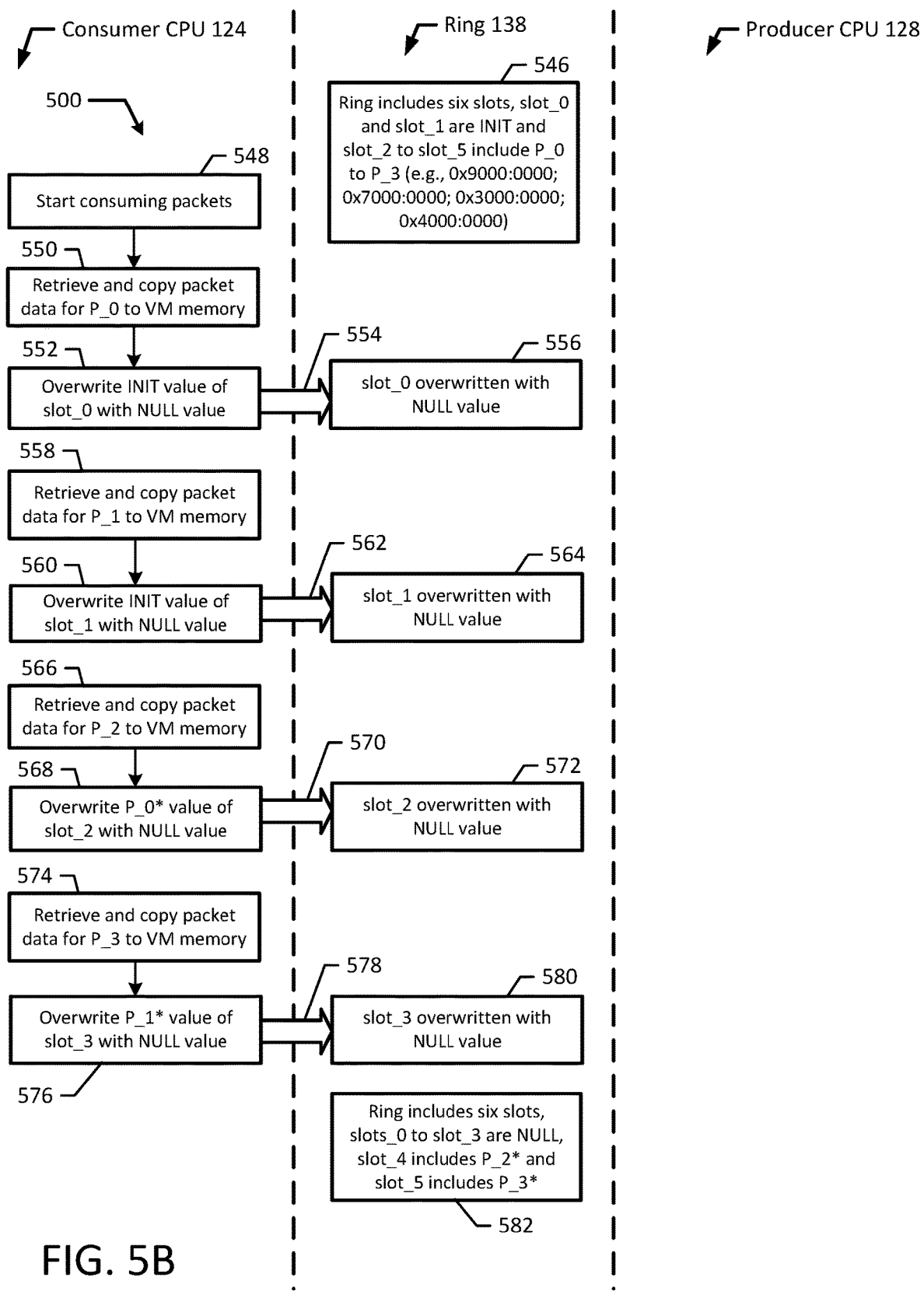
Figure 5C:
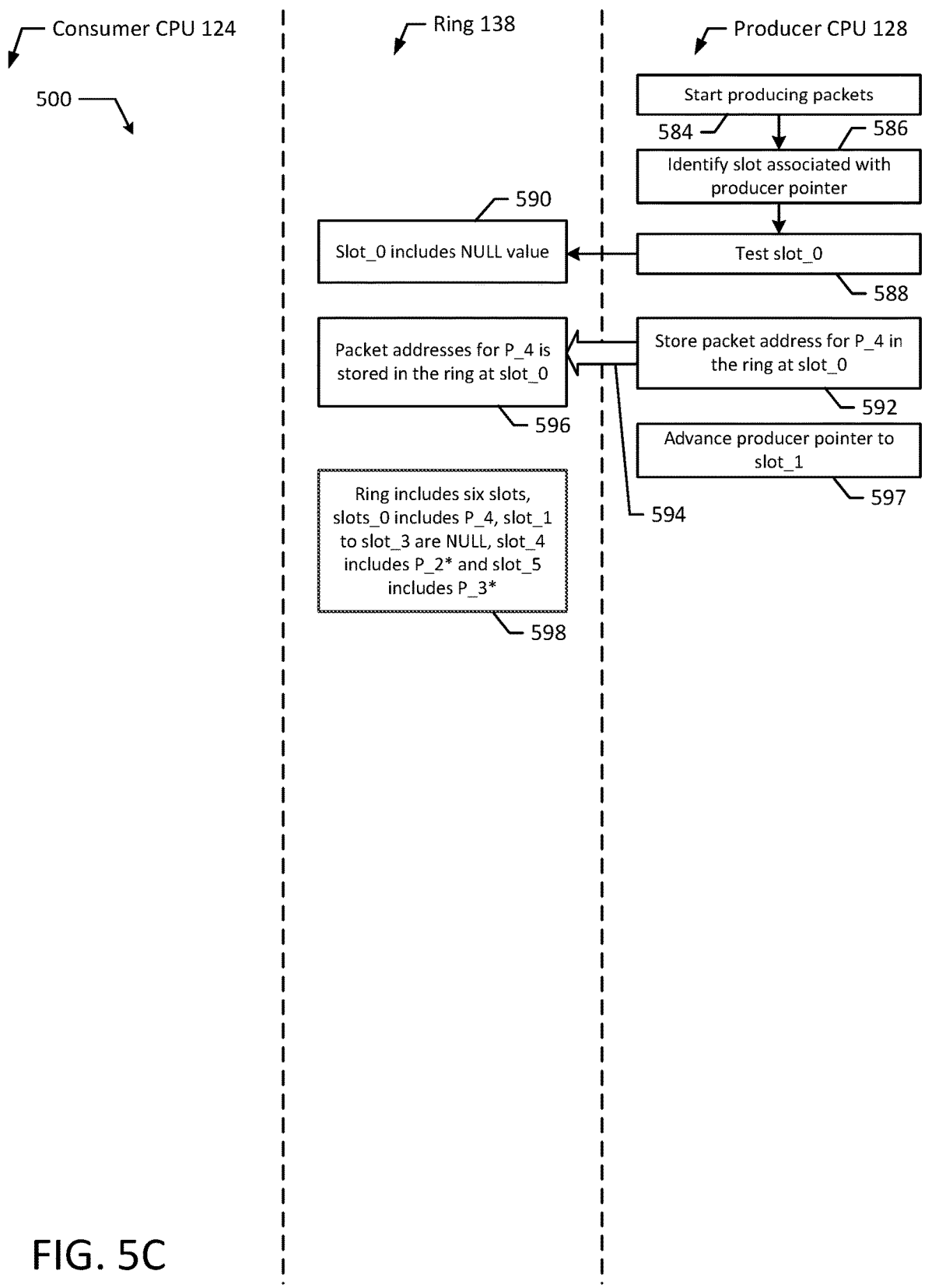

FIGS. 5A, 5B and 5C illustrate a flowchart of an example method 500 for memory cache-line bounce reduction in a pointer memory ring in accordance with an example of the present disclosure. Although the example method 500 is described with reference to the flowchart illustrated in FIGS. 5A, 5B and 5C it will be appreciated that many other methods of performing the acts associated with the method 500 may be used. For example, the order of some of the blocks may be changed, certain blocks may be combined with other blocks, and some of the blocks described are optional. For example, a consumer processor 124 (e.g., consumer CPU) and a producer processor 128 (e.g., producer CPU) may communicate with a ring buffer 138 to perform example method 500.

In the illustrated example, the ring 138 includes six slots (e.g., slot_0 to slot_5), where slot_0 and slot_1 are initialized with initialization values (e.g., 'INIT' values) and slot_2, slot_3, slot_4 and slot_5 are initialized with invalid values, such as NULL values (block 502). In an example, each slot may occupy a portion of a cache-line. In the illustrated example, the ring 138 may occupy an integer number of cache-lines (e.g., two cache-lines). However, the ring 138 may also occupy a non-integer number cache-lines.

In an example, a memory address of "0" may represent a NULL value and a value of "1" may represent an initialization value. The producer CPU 128 may receive a batch of packets associated with packet addresses P_0 to P_4 (block 504). For example, the producer CPU 128 may receive a batch of packets with packet addresses 0x9000:0000, 0x7000:0000, 0x3000:0000, 0x4000:0000 and 0x5000:0000 corresponding to packet addresses P_0 to P_4. Then, the producer CPU 128 may start producing packets (block 506). In an example, the producer CPU 128 may start producing packets (e.g., packet addresses) after receiving the batch 301 of packets.

To start producing packets, the producer CPU 128 may identify the slot associated with a producer pointer (block 508). For example, the producer CPU 128 may identify the slot indicated by the producer pointer (e.g., an original slot), which is preferably the next available slot after the last full slot (e.g., a slot that includes a non-NULL memory entry such as the slot after the last 'INIT' value slot). For example, if the ring buffer 138 is typically initialized with initialization values (e.g., 'INIT' values) in slot_0 and slot_1 and NULL values in slot_2 to slot_5, then in the illustrated example, the producer pointer would indicate slot_2 (e.g., the next available slot after slot_1) such that packets can sequentially be stored in slot_2 to slot_5. Then, the producer CPU may test the original slot (e.g., slot_2) (block 510). For example, the producer CPU 128 may test slot_2 to determine the value of the memory entry or packet address in the slot. In the illustrated example, the original slot includes a NULL value or "0" value (block 512). For example, the producer CPU 128 may read slot_2 while testing the first slot or original slot to determine that the first slot includes a packet address of "0".

After determining that the original slot includes a NULL value, the producer CPU 128 may walk to the second slot (e.g., slot_3) (block 514). For example, the producer CPU 128 may advance to the second slot using a walk function. Then, the producer CPU 128 may test the second slot (e.g., slot_3) (block 516). For example, the producer CPU 128 may test slot_3 to determine the value of the memory entry or packet address in the slot. In the illustrated example, the second slot includes a NULL value or "0" value (block 518). For example, the producer CPU 128 may read slot_3 while testing the second slot to determine that the second slot includes a packet address of "0". After determining that the second slot includes a NULL value, the producer CPU 128 may walk to the third slot (e.g., slot_4) (block 520). Similar to above, the producer CPU 128 may advance to the third slot using a walk function. Then, the producer CPU 128 may test the third slot (e.g., slot_4) (block 522). For example, the producer CPU 128 may test slot_3 to determine the value of the memory entry or packet address in the slot. In the illustrated example, the third slot includes a NULL value or "0" value (block 524). For example, the producer CPU 128 may read slot_4 while testing the third slot to determine that the third slot includes a packet address of "0". After determining that the third slot includes a NULL value, the producer CPU 128 may walk to the fourth slot (e.g., slot_5) (block 526), test the fourth slot (e.g., slot_5) (block 528) and determine the value of the memory entry or packet address in the fourth slot is a NULL value or "0" value (block 530).

Then, the producer CPU 128 may walk to the fifth slot (e.g., slot_0) after wrapping around to the start of the ring (block 532), test the fifth slot (e.g., slot_0) (block 534) and determine the value of the memory entry or packet address in the fifth slot is an 'INIT' value (block 536). Since there is an inadequate quantity of invalid value slots or empty slots for each packet (e.g., there is not a slot available for the packet associated with packet address P_4) in the batch of packets, the producer CPU 128 may store a portion of the batch (e.g., packets associated with packet addresses P_0 to P_3) in the ring buffer 138. In the illustrated example, the producer CPU 128 stores packet address for P_0 to P_3 in the ring from the original slot (e.g., slot_2) to the end slot (e.g., slot_5) (blocks 538 and 540). In an example, the producer CPU 128 may store packet addresses P_0 to P_3 in the ring buffer 138 in reverse order while walking the ring 138 backwards from slot_5 (e.g., the end slot) to slot_2 (e.g. the original slot). Then, the producer CPU 128 may advance the producer pointer to the fourth slot (e.g., slot_0) (block 544).

In an example, the producer CPU 128 may wait to advance the producer pointer to slot_0 until after the slot is consumed. By maintaining the producer pointer location, the producer CPU 128 may advantageously store packets or packet addresses in the ring buffer 138 in sequential order, as they are received in the batches, such that data is consumed by the consumer CPU 124 sequentially.

Now, the six slots of the ring 138 have 'INIT' values in slot_0 and slot_1 and slot_2 to slot_5 include packet addresses P_0 to P_3 respectively (e.g., addresses 0x9000:0000, 0x7000:0000, 0x3000:0000 and 0x4000:0000 and 0x5000:0000) (block 546).

Then, the consumer CPU 124 starts consuming packets (block 548). For example, the consumer CPU 124 retrieves and copies (e.g., consumes) packet data for P_0 to VM memory 195A (block 550). For example, the consumer CPU 124 may retrieve packet address P_0 from slot_2, and then copies the packet associated with packet address P_0 to VM memory 195A. Additionally, consuming packets may include invalidating slot_2. In an example, the packet data may be copied to VM memory 195A from a temporary memory location. Then, the consumer CPU 124 overwrites the 'INIT' value in slot_0 with a NULL value (blocks 552 and 554). Now, the ring 138 has slot_0 overwritten with a NULL value (block 556). The consumer CPU 124 also retrieves and copies (e.g., consumes) packet data for P_1 to VM memory 195A (block 558). For example, the consumer CPU 124 may retrieve packet address P_1 from slot_3, and then copies the packet associated with packet address P_1 to VM memory 195A. Additionally, consuming packets may include invalidating slot_3, and the consumer CPU 124 may overwrite the 'INIT' value in slot_1 with a NULL value (blocks 560 and 562). Now, the ring 138 has slot_1 overwritten with a NULL value (block 564).

Similarly, the consumer CPU 124 retrieves and copies packet data for P_2 to VM memory 195A (block 566) and overwrites the P_0* value of slot_2 with a NULL value (blocks 568 and 570) such that slot_2 in the ring buffer 138 includes a null value (block 572). As discussed above, the '*' indicates that the packet 'P_0' has been processed or consumed, which is denoted as 'P_0*' in FIG. 5B. Also, the consumer CPU 124 retrieves and copies packet data for 'P_3' to VM memory 195A (block 574) and overwrites the 'P_1*' value of slot_3 with a NULL value (blocks 576 and 578) such that slot_3 in the ring buffer 138 includes a null value (block 580) The consumer CPU 124 may wait until an entire batch of packets or the maximum quantity of packets from the batch is produced before consuming additional packets to ensure that adequate spacing is maintained between slots accessed by the producer CPU 128 and the consumer CPU 124 to help further reduce the frequency of cache line bounces.

Now, the six slots of the ring 138 have NULL values in slot_0 to slot_3, slot_4 includes packet address 'P_2*' and slot_5 includes packet address 'P_3*' (e.g., addresses 0x3000:0000 and 0x4000:0000) (block 582). The producer CPU 128 may start producing packets again (block 584). For example, the producer CPU 128 may identify the slot associated with the producer pointer (e.g., slot_0) (block 586). Then, the producer CPU 128 tests slot_0 (block 588) and determines that slot_0 includes a NULL value (block 590). After determining that slot_0 is available for production, the producer CPU 128 stores the packet address for 'P_4' in the ring buffer 138 at slot_0 (block 592 and 594). Then, the packet address for 'P_4' is stored in the ring at slot_0 (block 596).

Then, the producer CPU 128 may advance the producer pointer to the fourth slot (e.g., slot_1) (block 597). Now, the six slots of the ring 138 include packet address 'P_4' in slot_0, NULL values in slots_1 to slot_3, packet address 'P_2*' in slot_4 and packet address 'P_3*' in slot_5 (block 598). Therefore, the initial offsets chosen of 48 bytes and 0 bytes create a spacing between the slots successively accessed between the consumer CPU 124 and the producer CPU 128 to prevent cache-line bouncing. In the illustrated example, memory operations can be handled by both the producer CPU 128 and consumer CPU 124 without a cache-line bounce thereby improving performance (e.g., reduce latency and increased throughput). Additionally, the improved performance may be achieved without increasing the ring size by a factor of two, but instead by extending the shared memory region.

FIG. 6 is a block diagram of an example pointer ring structure production and consumption system 600 according to an example of the present disclosure. The pointer ring structure production and consumption system 600 includes a memory 610 including a ring buffer 620 having a plurality of slots 642A-C and at least one processor 650A-B in communication with the memory 610. A subset 680 of the plurality of slots (e.g., slots 642A-B) are initialized with an initialization value 644A-B. Additionally, the at least one processor 650A-B includes a consumer processor 650A and a producer processor 650B. The producer processor 650B is configured to receive a memory entry 662, identify an available slot (e.g., slot 642C) in the ring buffer 620 for the memory entry 662, and store the memory entry 662 in the available slot (e.g., slot 642C) at an offset 690 in the ring buffer 620. The initialization value 6424A-B is interpreted as an unavailable slot (e.g., slots 642A-B) by the producer processor 650B. The consumer processor 650A is configured to consume the memory entry 662, and invalidate one of the subset 680 of slots (e.g., slot 642A) in the ring buffer by overwriting the initialization value 644A with an invalid value 648 to transition the one of the subset 680 of slots (e.g., slot 642A) from an unavailable slot to an available slot.

Instead of a cache-line constantly bouncing between the consumer processor 650A and the producer processor 650B, the memory entry 662 is produced at the offset 690 (e.g., ahead of the slots 642A-B initialized with the initialization values 644A-B), which creates and maintains a spacing. The spacing advantageously allows memory operations such as processing (e.g., producing and consuming) memory entries 662 without the cache-line bouncing between the consumer processor 650A and the producer processor 650B, which improves performance (e.g., reduced latency and increased throughput) without substantially increasing the size of the ring buffer 620.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory including a ring buffer having a plurality of slots and at least one processor in communication with the memory. A subset of the plurality of slots are initialized with an initialization value. Additionally, the at least one processor includes a consumer processor and a producer processor. The producer processor is configured to receive a memory entry, identify an available slot in the ring buffer for the memory entry, and store the memory entry in the available slot at an offset in the ring buffer. The initialization value is interpreted as an unavailable slot by the producer processor. The consumer processor is configured to consume the memory entry and invalidate one of the subset of slots in the ring buffer by overwriting the initialization value with an invalid value to transition the one of the subset of slots from an unavailable slot to an available slot.

In a 2nd exemplary aspect of the present disclosure, which may be used in combination with any one or more of the preceding aspects (e.g., the 1st aspect), identifying the available slot includes walking the ring buffer starting from an original slot, wherein the original slot is indicated by a current producer pointer.

In a 3rd exemplary aspect of the present disclosure, which may be used in combination with any one or more of the preceding aspects (e.g., the 2nd aspect), the current producer pointer is an index.

In a 4th exemplary aspect of the present disclosure, which may be used in combination with any one or more of the preceding aspects (e.g., the 1st aspect), the producer processor is further configured to prior to storing the memory entry, walk the ring buffer.

In a 5th exemplary aspect of the present disclosure, which may be used in combination with any one or more of the preceding aspects (e.g., the 1st aspect), identifying the available slot includes testing a respective value associated with a respective memory entry of a slot in the ring buffer. Additionally, the testing is conducted while the contents of each slot remain unchanged.

In a 6th exemplary aspect of the present disclosure, which may be used in combination with any one or more of the preceding aspects (e.g., the 5th aspect), an unavailable slot includes a non-NULL value. Upon receiving a non-NULL value from the test, the producer processor is configured to return an un-stored memory entry.

In a 7th exemplary aspect of the present disclosure, which may be used in combination with any one or more of the preceding aspects (e.g., the 6th aspect), a non-NULL value includes one of a valid memory entry and an initialization value.

In an 8th exemplary aspect of the present disclosure, which may be used in combination with any one or more of the preceding aspects (e.g., the 1st aspect), the consumer processor is configured to retrieve the memory entry and copy the respective memory entry to a second memory.

In a 9th exemplary aspect of the present disclosure, which may be used in combination with any one or more of the preceding aspects (e.g., the 1st aspect), the producer processor is further configured to receive additional memory entries along with the memory entry, which form a batch of memory entries. The batch of memory entries has an initial memory entry and a final memory entry. Additionally, the producer processor is configured to identify a last memory entry in the batch of memory entries such that each of the initial memory entry to the last memory entry form a group that fits in available slots in the ring buffer. The last memory entry and the final memory entry are the same memory entry.

In a 10th exemplary aspect of the present disclosure, which may be used in combination with any one or more of the preceding aspects (e.g., the 9th aspect), the system further includes a batch counter, wherein the batch counter is configured to count memory entries and send the batch of memory entries to the producer processor.

In an 11th exemplary aspect of the present disclosure, which may be used in combination with any one or more of the preceding aspects (e.g., the 1st aspect), the memory entry is a packet address.

In a 12th exemplary aspect of the present disclosure, which may be used in combination with any one or more of the preceding aspects (e.g., the 1st aspect), the invalid value is a NULL value.

In a 13th exemplary aspect of the present disclosure, which may be used in combination with any one or more of the preceding aspects (e.g., the 1st aspect), the consumer processor and the producer processor execute on different cores of the same physical processor.

In a 14th exemplary aspect of the present disclosure, which may be used in combination with any one or more of the preceding aspects (e.g., the 1st aspect), the consumer processor and the producer processor execute on different physical processors.

In a 15th exemplary aspect of the present disclosure, which may be used in combination with any one or more of the preceding aspects (e.g., the 1st aspect), the system further includes a second memory, wherein the second memory is a virtual memory.

In a 16th exemplary aspect of the present disclosure, which may be used in combination with any one or more of the preceding aspects (e.g., the 1st aspect), the ring buffer is an augmented ring that is initialized with a first quantity of additional slots and the subset of the slots has a second quantity. Additionally, the first quantity equals the second quantity.

Aspects of the subject matter described herein may be useful alone or in combination with one or more other aspects described herein. In a 17th exemplary aspect of the present disclosure, a method includes receiving, by a producer processor, a memory entry. Additionally, the producer processor identifies an available slot in a ring buffer having a plurality of slots. A subset of the slots is initialized with an initialization value, and the initialization value is interpreted as an unavailable slot by the producer processor. The producer processor also stores the memory entry in the available slot at an offset in the ring buffer. Additionally, the method includes consuming, by a consumer processor, the memory entry, and invalidating, by the consumer processor, one of the subset of slots in the ring buffer by overwriting the initialization value with an invalid value to transition the one of the subset of slots from an unavailable slot to an available slot.

In an 18th exemplary aspect of the present disclosure, which may be used in combination with any one or more of the preceding aspects (e.g., the 17th aspect), identifying the available slot includes walking, by the producer processor, the ring buffer starting from an original slot, wherein the original slot is indicated by a current producer pointer.

In a 19th exemplary aspect of the present disclosure, which may be used in combination with any one or more of the preceding aspects (e.g., the 18th aspect), the method further includes advancing, by the producer processor, the current producer pointer to the end slot.

In a 20th exemplary aspect of the present disclosure, which may be used in combination with any one or more of the preceding aspects (e.g., the 17th aspect), the method further includes prior to storing the memory entry, walking, by the producer processor, the ring buffer.

In a 21st exemplary aspect of the present disclosure, which may be used in combination with any one or more of the preceding aspects (e.g., the 17th aspect), identifying the available slot includes testing a respective value associated with a respective memory entry of a slot in the ring buffer. The testing is conducted while the contents of each slot remain unchanged.

In a 22nd exemplary aspect of the present disclosure, which may be used in combination with any one or more of the preceding aspects (e.g., the 21st aspect), an unavailable slot includes a non-NULL value. The method further includes upon receiving the non-NULL value from the test, returning, by the producer processor, an un-stored memory entry.

In a 23rd exemplary aspect of the present disclosure, which may be used in combination with any one or more of the preceding aspects (e.g., the 21st aspect), the method further includes responsive to testing an unavailable slot, pausing, by the producer processor, a predetermined timespan before testing the slot again.

In a 24th exemplary aspect of the present disclosure, which may be used in combination with any one or more of the preceding aspects (e.g., the 17th aspect), the method further includes retrieving, by the consumer processor, the memory entry from a first memory and copying the memory entry to a second memory.

In a 25th exemplary aspect of the present disclosure, which may be used in combination with any one or more of the preceding aspects (e.g., the 17th aspect), consuming the memory entry includes retrieving, by the consumer processor, the memory entry from a first memory and copying the memory entry to a second memory.

In a 26th exemplary aspect of the present disclosure, which may be used in combination with any one or more of the preceding aspects (e.g., the 17th aspect), the consumer processor starts processing the memory entry after a batch of memory entries has been stored by the producer processor.

Aspects of the subject matter described herein may be useful alone or in combination with one or more other aspects described herein. In a 27th exemplary aspect of the present disclosure, a non-transitory machine-readable medium storing code, which when executed by a producer processor and a consumer processor, is configured to receive a memory entry and identify an available slot in a ring buffer having a plurality of slots. A subset of the slots is initialized with an initialization value, and the initialization value is interpreted as an unavailable slot by the producer processor. The non-transitory machine-readable medium is also configured to store the memory entry in the available slot at an offset in the ring buffer, consume the memory entry and invalidate one of the subset of slots in the ring buffer by overwriting the initialization value with an invalid value to transition the one of the subset of slots from an unavailable slot to an available slot.

Aspects of the subject matter described herein may be useful alone or in combination with one or more other aspects described herein. In a 28th exemplary aspect of the present disclosure, a system includes a means for receiving a memory entry and a means for identifying an available slot in a ring buffer having a plurality of slots. A subset of the slots is initialized with an initialization value, and the initialization value is interpreted as an unavailable slot by the producer processor. The system also includes a means for storing the memory entry in the available slot at an offset in the ring buffer, a means for consuming the memory entry, and a means for invalidating one of the subset of slots in the ring buffer by overwriting the initialization value with an invalid value to transition the one of the subset of slots from an unavailable slot to an available slot Aspects of the subject matter described herein may be useful alone or in combination with one or more other aspects described herein. In a 29th exemplary aspect of the present disclosure, a system includes a memory including a ring buffer with a plurality of slots. A first subset of the plurality of slots is initialized with an initialization value and a second subset of the plurality of slots is initialized with an invalid value. The system also includes a producer processor and a consumer processor, both of which are in communication with the memory. The producer processor is configured to receive a plurality of requests associated with a plurality of respective memory entries and store each of the plurality of requests in a respective slot that contains an invalid value. The producer processor is prevented from storing a request in a slot occupied by a valid value and is prevented from storing a request in a slot occupied by an initialization value. The consumer processor is configured to process each of the plurality of requests and invalidate one of a plurality of respective slots for each of the plurality of stored requests. Each of the plurality of respective slots includes one of an initialization value and a valid value, and the consumer processor invalidates a first slot initialized with an initialization value for a first stored request of the plurality of stored requests.

In a 30th exemplary aspect of the present disclosure, which may be used in combination with any one or more of the preceding aspects (e.g., the 29th aspect), the first subset of initialization values is configured to maintain a spacing between the consumer processor and the producer process. Additionally, the spacing includes a set of slots that occupy less than one entire cache-line.

In a 31st exemplary aspect of the present disclosure, which may be used in combination with any one or more of the preceding aspects (e.g., the 29th aspect), the producer processor is configured to interpret an initialization value as a valid value.

In a 32nd exemplary aspect of the present disclosure, which may be used in combination with any one or more of the preceding aspects (e.g., the 29th aspect), the consumer processor is configured to interpret an initialization value as a valid value.

In a 33rd exemplary aspect of the present disclosure, which may be used in combination with any one or more of the preceding aspects (e.g., the 29th aspect), processing each of the plurality of requests includes retrieving each of the plurality of requests and copying each of the plurality of requests to a different memory.

In a 34th exemplary aspect of the present disclosure, which may be used in combination with any one or more of the preceding aspects (e.g., the 29th aspect), the consumer processor and the producer processor execute on different cores of a physical processor.

In a 35th exemplary aspect of the present disclosure, which may be used in combination with any one or more of the preceding aspects (e.g., the 29th aspect), the consumer processor and the producer processor execute on different physical processors.

In a 36th exemplary aspect of the present disclosure, which may be used in combination with any one or more of the preceding aspects (e.g., the 29th aspect), the first slot is initialized with an initialization value is in a different cache line than the slot with the first stored request.

In a 37th exemplary aspect of the present disclosure, which may be used in combination with any one or more of the preceding aspects (e.g., the 29th aspect), the ring buffer occupies a non-integer number of cache lines.

In a 38th exemplary aspect of the present disclosure, which may be used in combination with any one or more of the preceding aspects (e.g., the 29th aspect), the ring buffer occupies an integer number of cache lines.

In a 39th exemplary aspect of the present disclosure, which may be used in combination with any one or more of the preceding aspects (e.g., the 29th aspect), the ring buffer is augmented with a quantity of additional slots and each slot of the quantity of additional slots is initialized with the initialization value.

Aspects of the subject matter described herein may be useful alone or in combination with one or more other aspects described herein. In a 40th exemplary aspect of the present disclosure, method includes receiving, by a producer processor, a plurality of requests associated with a plurality of respective memory entries. The producer processor stores each of the plurality of requests in a respective slot that contains an invalid value. The producer processor is prevented from storing a request in a slot occupied by a valid value and is prevented from storing a request in a slot occupied by an initialization value. The method also includes processing, by a consumer processor, each of the plurality of requests. Additionally, the consumer processor invalidates one of a plurality of respective slots for each of the plurality of stored requests by first invalidating a first slot initialized with an initialization value for a first stored request of the plurality of stored requests. Each of the plurality of respective slots includes one of an initialization value and a valid value.

In a 41st exemplary aspect of the present disclosure, which may be used in combination with any one or more of the preceding aspects (e.g., the 40th aspect), a first subset of initialization values is configured to maintain a spacing between the consumer processor and the producer process, and the spacing includes a set of slots that occupy less than one entire cache-line.

In a 42nd exemplary aspect of the present disclosure, which may be used in combination with any one or more of the preceding aspects (e.g., the 40th aspect), processing each of the plurality of requests includes retrieving each of the plurality of requests and copying each of the plurality of requests to a different memory.

In a 43rd exemplary aspect of the present disclosure, which may be used in combination with any one or more of the preceding aspects (e.g., the 40th aspect), the method further includes allocating an augmented ring buffer forming each of the respective slots. The augmented ring buffer includes a quantity of additional slots and each additional slot is initialized with a respective initialization value.

Aspects of the subject matter described herein may be useful alone or in combination with one or more other aspects described herein. In a 44th exemplary aspect of the present disclosure, a non-transitory machine-readable medium storing code, which when executed by a producer processor and a consumer processor, is configured to receive a plurality of requests associated with a plurality of respective memory entries and store each of the plurality of requests in a respective slot that contains an invalid value. The producer processor is prevented from storing a request in a slot occupied by a valid value and prevented from storing a request in a slot occupied by an initialization value. The non-transitory machine-readable medium is also configured to process each of the plurality of requests and invalidate one of a plurality of respective slots for each of the plurality of stored requests by first invalidating a first slot initialized with an initialization value for a first stored request of the plurality of stored requests. Each of the plurality of respective slots includes one of an initialization value and a valid value.

Aspects of the subject matter described herein may be useful alone or in combination with one or more other aspects described herein. In a 45th exemplary aspect of the present disclosure, a system includes a means for receiving a plurality of requests associated with a plurality of respective memory entries and a means for storing each of the plurality of requests in a respective slot that contains an invalid value. The means for storing is prevented from storing a request in a slot occupied by a valid value and prevented from storing an initialization value The system also includes a means for processing each of the plurality of requests, and a means for invalidating one of a plurality of respective slots for each of the plurality of stored requests by first invalidating a first slot initialized with an initialization value for a first stored request of the plurality of stored requests, wherein each of the plurality of respective slots includes one of an initialization value and a valid value.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed is follows:

1. A system comprising:
a memory including a ring buffer having a plurality of slots, wherein a subset of the slots is initialized with an initialization value included in the ring buffer in each respective slot in the subset, such that a plurality of initialization values is included in the ring buffer;
at least one processor in communication with the memory, wherein the at least one processor includes a consumer processor associated with a hypervisor and a producer processor associated with a guest operating system (OS) running on a virtual machine, and the producer processor is configured by the guest OS to:
receive a memory entry,
identify an available slot in the ring buffer for the memory entry, wherein the plurality of initialization values determines an initial spacing between the consumer processor and the producer processor and each initialization value is interpreted as an unavailable slot by the producer processor, and wherein the producer processor determines an availability of a slot by inspecting all data contained within the slot, and
store the memory entry in the available slot in the ring buffer; and
wherein the consumer processor is configured by the hypervisor to:
consume the memory entry at a first slot of the plurality of slots, and
invalidate a second slot of the subset of slots in the ring buffer by overwriting the initialization value of the second slot, located at an offset of a predetermined quantity of slots from the first slot, with an invalid value to transition the second slot from unavailable to available while positioning the invalid value in a different cache-line than the memory entry and maintaining a spacing between the consumer processor and the producer processor, wherein the spacing is equal to the offset, and the guest OS is prevented from storing data in any respective slot within the spacing until the respective slot in the spacing is invalidated by the hypervisor to reduce cache line bounces between the consumer processor and the producer processor when forwarding incoming data from the hypervisor to the virtual machine.

2. The system of claim 1, wherein identifying the available slot includes walking the ring buffer starting from an original slot, wherein the original slot is indicated by a current producer pointer.

3. The system of claim 2, wherein the current producer pointer is an index.

4. The system of claim 1, wherein the producer processor is further configured to:
prior to storing the memory entry, walk the ring buffer.

5. The system of claim 1, wherein identifying the available slot includes testing a respective value associated with a respective memory entry of an original slot in the ring buffer, wherein the testing is conducted while contents of each slot remain unchanged.

6. The system of claim 5, wherein the unavailable slot includes a valid memory entry with a non-NULL value, and wherein upon receiving the non-NULL value from the testing, the producer processor is configured to return an unproduced request.

7. The system of claim 5, wherein the unavailable slot includes a non-NULL, initialization value, and wherein upon receiving the non-NULL, initialization value from the testing, the producer processor is configured to return an unproduced request.

8. The system of claim 1, wherein the consumer processor is configured to retrieve the memory entry and copy the respective memory entry to a second memory.

9. The system of claim 1, wherein the producer processor is configured to:
receive additional memory entries along with the memory entry, which form a batch of memory entries, the batch of memory entries having an initial memory entry and a final memory entry; and
identify a last memory entry in the batch of memory entries such that each of the initial memory entry to the last memory entry form a group that fits in available slots in the ring buffer, wherein the last memory entry and the final memory entry are the same memory entry.

10. The system of claim 9, further comprising a batch counter, wherein the batch counter is configured to count memory entries and send the batch of memory entries to the producer processor.

11. The system of claim 1, wherein the memory entry is a packet address.

12. The system of claim 1, wherein the consumer processor and the producer processor execute on different cores of a same physical processor.

13. The system of claim 1, further comprising a second memory, wherein the second memory is a virtual memory.

14. The system of claim 1, wherein the ring buffer is an augmented ring that is initialized with a first quantity of additional slots, the subset of the slots having a second quantity, and wherein the first quantity equals the second quantity.

15. A method comprising:
receiving, by a producer processor associated with a guest operating system (OS) running on a virtual machine, a memory entry;
identifying, by the producer processor, an available slot in a ring buffer having a plurality of slots, wherein a subset of the slots is initialized with an initialization value included in the ring buffer in each respective slot in the subset, such that a plurality of initialization values that determines an initial spacing between the producer processor and a consumer processor associated with a hypervisor is included in the ring buffer, and each initialization value is interpreted as an unavailable slot by the producer processor, and wherein the producer processor determines an availability of a slot by inspecting all data contained within the slot;
storing, by the producer processor, the memory entry in the available slot in the ring buffer;
consuming, by the consumer processor, the memory entry at a first slot of the plurality of slots; and
invalidating, by the consumer processor, a second slot of the subset of slots in the ring buffer by overwriting the initialization value of the second slot, located at an offset of a predetermined quantity of slots from the first slot, with an invalid value to transition the second slot from unavailable to available while positioning the invalid value in a different cache-line than the memory entry and maintaining a spacing between the consumer processor and the producer processor, wherein the spacing is equal to the offset, and the guest OS is prevented from storing data in any respective slot within the spacing until the respective slot in the spacing is invalidated by the hypervisor to reduce cache line bounces between the consumer processor and the producer processor when forwarding incoming data from the hypervisor to the virtual machine.

16. The method of claim 15, wherein identifying the available slot includes walking, by the producer processor, the ring buffer starting from an original slot, wherein the original slot is indicated by a current producer pointer.

17. The method of claim 16, further comprising advancing, by the producer processor, the current producer pointer to an end slot of the ring buffer.

18. The method of claim 15, wherein identifying the available slot includes testing a respective value associated with a respective memory entry of a slot in the ring buffer, wherein the testing is conducted while contents of each slot remain unchanged.

19. A method comprising:
receiving, by a producer processor associated with a guest operating system (OS) running on a virtual machine, a plurality of requests associated with a plurality of respective memory entries;
storing, by the producer processor, each of the plurality of requests in a respective slot that contains an invalid value, wherein the guest OS is prevented from storing a request in a slot occupied by a valid value and prevented from storing a request in a slot occupied by an initialization value, wherein a plurality of initialization values in a plurality of respective slots determines an initial spacing between the producer processor and a consumer processor associated with a hypervisor, and wherein the guest OS determines an availability of a slot by inspecting all data contained within the slot;
processing, by the hypervisor, each of the plurality of requests; and
invalidating, by the consumer processor, a first slot, initialized with an initialization value, wherein the first slot is offset by a predetermined quantity of slots from a second slot which contains a stored request of the plurality of stored requests while positioning the invalid value in a different cache-line than the memory entry and maintaining a spacing between the consumer processor and the producer processor equal to the offset, wherein each of the plurality of respective slots includes one of an initialization value and a valid value, and the guest OS is prevented from storing data in any respective slot within the spacing until the respective slot in the spacing is invalidated by the hypervisor to reduce cache line bounces between the consumer processor and the producer processor when forwarding incoming data from the hypervisor to the virtual machine.

20. The method of claim 19, further comprising allocating an augmented ring buffer forming each of the respective slots, wherein the augmented ring buffer includes a quantity of additional slots, and wherein each additional slot is initialized with a respective initialization value.

* * * * *